United States Patent
Janssens et al.

(10) Patent No.: US 10,267,200 B2
(45) Date of Patent: Apr. 23, 2019

(54) HEAT RECOVERY COMPONENT FOR AN EXHAUST GAS SYSTEM OF AN INTERNAL COMBUSTION ENGINE

(71) Applicant: Bosal Emission Control Systems NV, Lummen (BE)

(72) Inventors: Jean-Paul Hubert Janssens, Leopoldsburg (BE); Luk Dedene, Heusden-Zolder (BE); Eric Frans Denis Hansenne, Soumagne (BE)

(73) Assignee: Bosal Emission Control Systems NV, Lummen (BE)

( * ) Notice: Subject to any disclaimer, the term of this patent is extended or adjusted under 35 U.S.C. 154(b) by 246 days.

(21) Appl. No.: 15/264,090

(22) Filed: Sep. 13, 2016

(65) Prior Publication Data

US 2017/0074142 A1 Mar. 16, 2017

(30) Foreign Application Priority Data

Sep. 14, 2015 (EP) .................................... 15185121

(51) Int. Cl.
*F01N 5/02* (2006.01)
*F01N 3/02* (2006.01)
(Continued)

(52) U.S. Cl.
CPC ............. *F01N 5/02* (2013.01); *F01N 3/0205* (2013.01); *F01N 3/2889* (2013.01); *F02G 5/02* (2013.01);
(Continued)

(58) Field of Classification Search
CPC ........ F01N 5/02; F01N 3/0205; F01N 3/2889; F02G 5/02; F28F 27/02; F28F 2250/06;
(Continued)

(56) References Cited

U.S. PATENT DOCUMENTS

| 5,427,141 A | 6/1995 | Ohtsubo |
| 6,141,961 A | 11/2000 | Rinckel |

(Continued)

FOREIGN PATENT DOCUMENTS

| DE | 4425028 C1 | 11/1995 |
| DE | 10041579 A1 * | 3/2002 ............. F02M 26/26 |

(Continued)

OTHER PUBLICATIONS

Extended European Search Report for European Patent Application No. 15185121.9, dated Mar. 10, 2016.

*Primary Examiner* — Laert Dounis
*Assistant Examiner* — Kelsey L Stanek
(74) *Attorney, Agent, or Firm* — Merchant & Gould PC

(57) ABSTRACT

A heat recovery component for an exhaust gas system comprises:
an inlet;
an outlet;
a first branch conduit comprising a first inlet, a first inlet axis, a first outlet, and a heat exchanger;
a second branch conduit parallel to the first branch conduit, separate and thermally separated from the first branch conduit and comprising a second inlet, a second inlet axis, and a second outlet; and
a valve arranged at the first inlet and the second inlet.
The valve comprises separate first and second valve flaps fixedly arranged on a shaft and extending in a plane defined by the first and second inlet axes and perpendicular to the first and second inlet axes. The first valve flap is arranged at an axial location on the shaft corresponding to the location of the first inlet, and the second valve flap is arranged at an axial location corresponding to the second inlet. The valve flaps are arranged angularly rotated relative to one another about the shaft.

14 Claims, 8 Drawing Sheets

(51) Int. Cl.
*F01N 3/28* (2006.01)
*F02G 5/02* (2006.01)
*F28F 13/06* (2006.01)
*F28F 27/02* (2006.01)

(52) U.S. Cl.
CPC .............. *F28F 13/06* (2013.01); *F28F 27/02* (2013.01); *F01N 2240/02* (2013.01); *F01N 2240/36* (2013.01); *F28F 2250/06* (2013.01); *F28F 2270/00* (2013.01); *Y02T 10/16* (2013.01); *Y02T 10/166* (2013.01); *Y02T 10/20* (2013.01)

(58) Field of Classification Search
CPC .... F28F 2270/00; Y02T 10/16; Y02T 10/166; Y02T 10/20
USPC .......................................................... 60/320

See application file for complete search history.

(56) References Cited

U.S. PATENT DOCUMENTS

| | | | |
|---|---|---|---|
| 6,584,767 | B1 | 7/2003 | Koenig |
| 6,942,027 | B2 | 9/2005 | Klotten et al. |
| 8,695,332 | B2 | 4/2014 | Smith et al. |
| 2004/0251012 | A1 | 12/2004 | Bush et al. |
| 2013/0061584 | A1 | 3/2013 | Gerges et al. |
| 2013/0213606 | A1 | 8/2013 | Greber |
| 2014/0299115 | A1 * | 10/2014 | Zhang ............... F28F 9/02 123/568.12 |
| 2015/0027666 | A1 | 1/2015 | Hisanaga et al. |

FOREIGN PATENT DOCUMENTS

| | | | |
|---|---|---|---|
| EP | 2458182 A1 * | 5/2012 | ............ F02D 9/04 |
| EP | 2772620 A1 | 9/2014 | |
| EP | 2803843 A1 | 11/2014 | |
| GB | 2381576 A | 5/2003 | |
| JP | 2011-256783 A1 | 12/2011 | |
| WO | 02/16750 A1 | 2/2002 | |
| WO | 2012/010960 A1 | 1/2012 | |
| WO | 2014/090792 A1 | 6/2014 | |
| WO | 2014/147064 A1 | 9/2014 | |

* cited by examiner

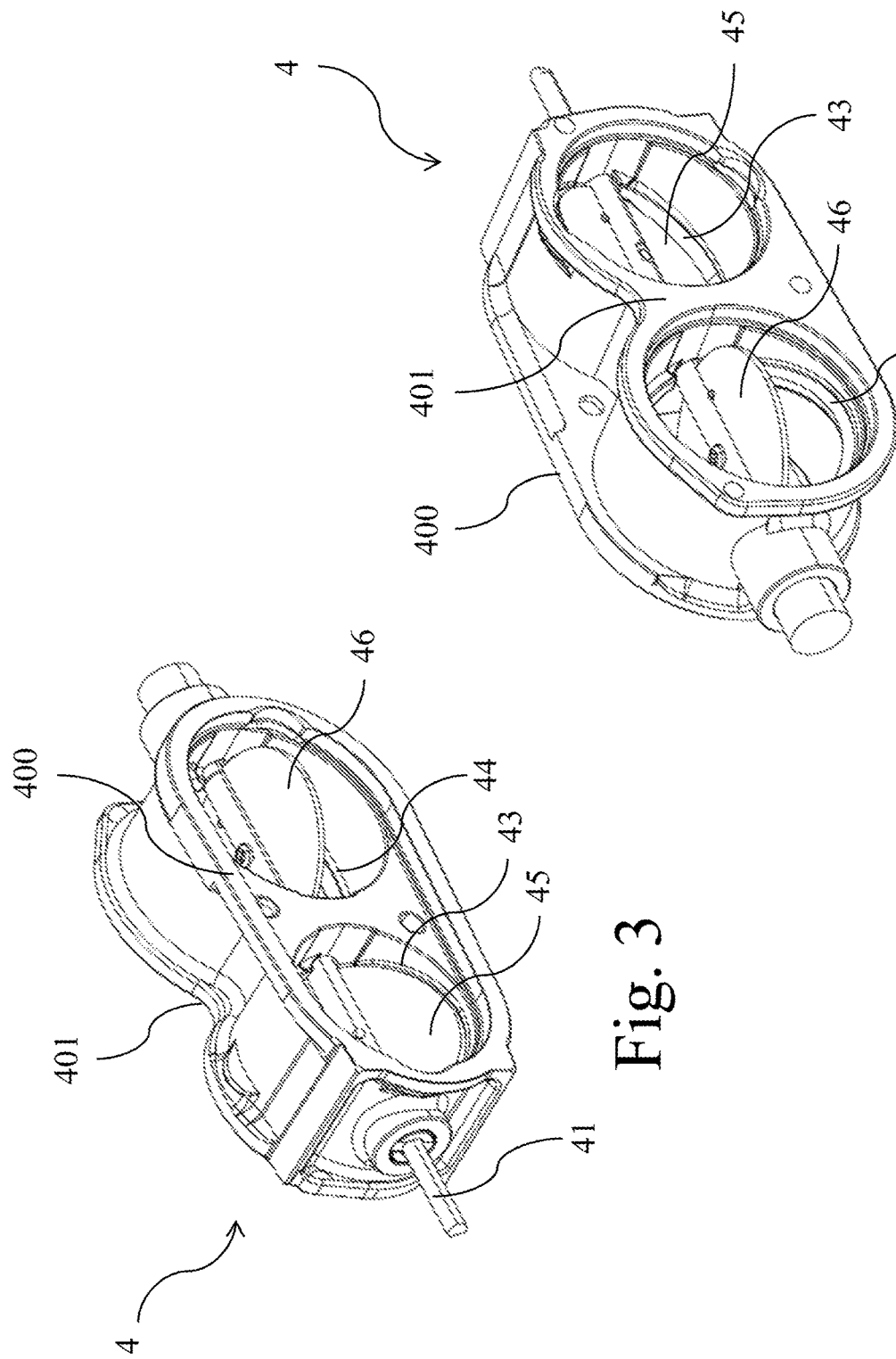

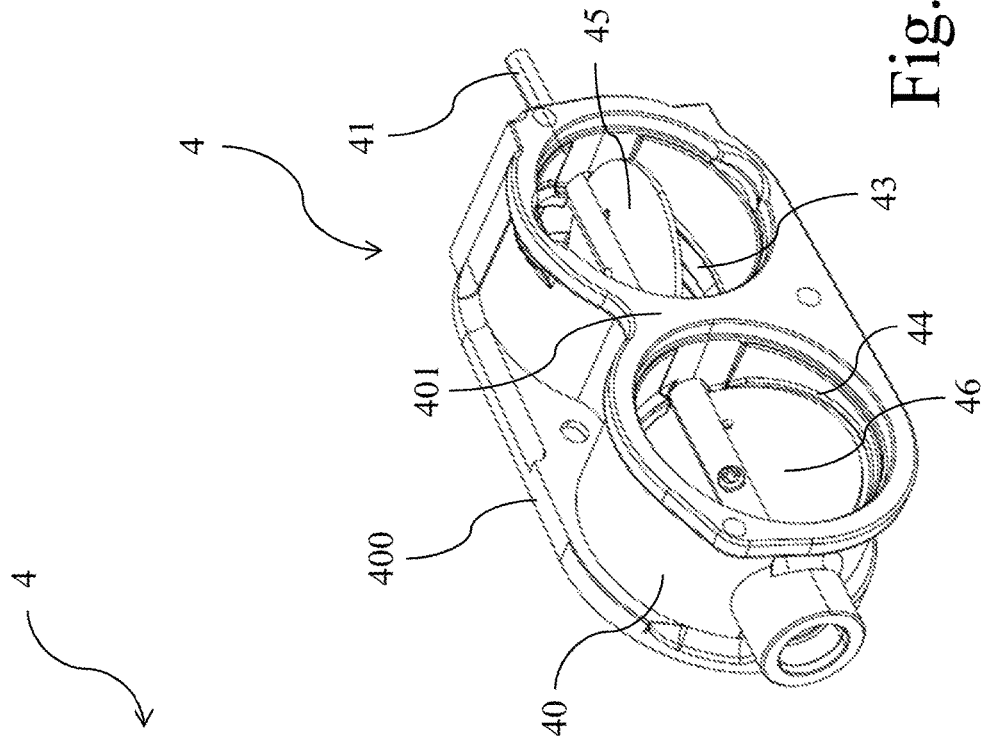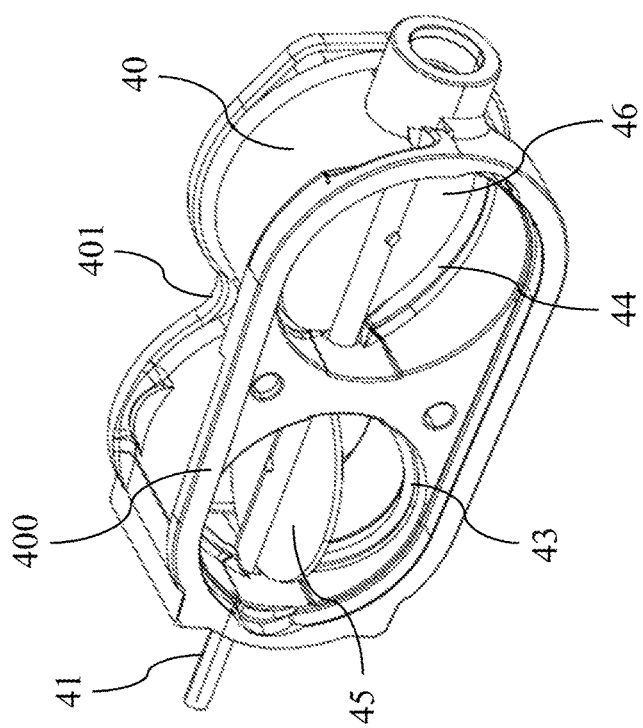

HEAT RECOVERY COMPONENT FOR AN EXHAUST GAS SYSTEM OF AN INTERNAL COMBUSTION ENGINE

This application claims benefit of Ser. No. 15185121.9, filed on 14 Sep. 2015 in the European Patent Office and which application is incorporated herein by reference. To the extent appropriate, a claim of priority is made to the above disclosed application.

The present invention relates to a heat recovery component for an exhaust gas system of an internal combustion engine. In particular, the invention relates to a heat recovery component for an exhaust gas system of an internal combustion engine of a motor vehicle, for example a car.

The requirements imposed on internal combustion engines and exhaust gas systems are becoming more and more strict regarding the emission of certain gaseous components and/or particles in order to better protect the environment. This holds in particular for, but is not limited to, internal combustion engines used in the field of motor vehicles such as cars. Thermal energy contained in the exhaust gas stream coming from the engine can be used for various purposes, for example to enhance comfort and/or to reduce fuel consumption. For instance, it has been suggested to use thermal energy (heat) contained in the exhaust gas stream of a car to more quickly heat up the passenger compartment of the car, thus increasing passenger comfort. Also, it has been suggested to use thermal energy (heat) contained in the exhaust gas stream to heat up the cooling fluid flowing through the engine and/or to heat up the engine oil and/or to heat up the transmission oil during a heating-up phase of the engine. A heating-up of the cooling fluid using thermal energy (heat) contained in the exhaust gas stream results in a quicker heating-up of the engine, which in turn results in that the engine reaches the desired operating temperature at which the emissions are kept at a minimum in a shorter time after having started the engine. Once the engine has reached the desired operating temperature, the cooling fluid should no longer be heated to avoid an overheating of the engine.

Exhaust gas heat recovery components have been suggested to use thermal energy contained in the exhaust gas stream coming from the engine. The use of exhaust gas heat recovery components is especially beneficial for hybrid vehicles to increase passenger comfort, to reduce harmful exhaust emissions, and to reduce fuel consumption. A faster heating-up of the cooling fluid (e.g. engine coolant water) through heat recovered from the exhaust gas allows for a very fast heating-up of the passenger compartment and reduces or avoids the consumption of electric energy from the battery for this purpose, thereby increasing the driving range of such hybrid vehicles in electric mode. When performing a cold start of a hybrid vehicle, the combustion engine can be switched off once the desired operating temperature is reached. With the aid of a heat recovery component the engine can therefore be switched off faster after a cold start, resulting in reduced emissions and reduced fuel consumption.

To recover heat contained in the exhaust gas stream and to use that heat for the heating-up of the cooling fluid, it is known to arrange a heat exchanger in the exhaust gas system. The cooling fluid flowing through the engine also flows through the heat exchanger, so that during the heating-up phase of the engine heat contained in the exhaust gas stream is used to heat up the cooling fluid flowing through the heat exchanger. Since the heated cooling fluid then flows through the engine again it additionally heats up the engine. Once the engine has reached a desired operating temperature, the exhaust gas stream is more or less prevented from flowing through the heat exchanger. The cooling fluid then performs its normal function of cooling the engine and maintaining the desired temperature of the engine. In this operational mode, a further heating-up of the cooling fluid (e.g. engine coolant water) is undesired. On the other hand, the heat recovery cannot be completely reduced to zero. Therefore, although unwanted, in this operational mode there is still some heat recovered which is referred to in the following as "parasitic heat". This parasitic heat should be as small as possible since the engine coolant circuit must be dimensioned so as to be able to cope with this parasitic heat. Accordingly, the more parasitic heat occurs the larger the package space and weight of the coolant system must be in order to be able to cope with the parasitic heat.

Different constructional approaches of exhaust gas heat recovery components that can be used for the afore-described purpose in an exhaust gas system of an internal combustion engine are known from the prior art. For example, a heat recovery component suitable for this purpose is disclosed in U.S. Pat. No. 6,141,961. The heat recovery component disclosed there comprises an inlet and two branch conduits through which the exhaust gas may flow to the outlet of the component. A heat exchanger is arranged in one branch conduit, while the other branch conduit comprises in essence a pipe and a thermal expansion compensator for compensating different thermal expansions in length. A valve flap mounted to a shaft is arranged at the inlets of the two branch conduits, and this valve flap can be pivoted about the shaft between a first end position, in which the exhaust gas is intended to only flow through that branch conduit in which the heat exchanger is arranged, and a second end position, in which that branch conduit in which the heat exchanger is arranged is intended to be shut off, so that the exhaust gas is intended to only flow through that branch conduit bypassing the branch conduit in which the heat exchanger is arranged. The position of the valve flap is controlled such that during the heating-up phase of the engine the exhaust gas stream is intended to only flow through that branch conduit in which the heat exchanger is arranged, and once the engine has reached a desired temperature the exhaust gas stream is intended to only flow through that branch conduit bypassing the branch in which the heat exchanger is arranged. However, as mentioned already, even in the first and second end positions of the valve flap there is leakage leading to parasitic heat. The exhaust gas heat recovery component shown in U.S. Pat. No. 6,141,961, in particular due to the specific manner the valve flap is embodied/arranged, is prone to a not insubstantial leakage when the valve is arranged in the first and second end positions which in turn results in a comparatively large amount of parasitic heat occurring.

Exhaust gas heat recovery components are preferably arranged comparatively close to the engine where the temperature of the exhaust gas stream is very high in order to as effectively as possible use the thermal energy (heat) contained in the exhaust gas stream. However, in the direction of flow of the exhaust gas stream out of the engine, first of all a manifold is connected to the outlets of the engine, which is then typically followed by the exhaust gas treatment components (e.g. catalytic converter, particle filter, etc.). Further in the direction of flow of the exhaust gas stream, the exhaust gas heat recovery component may then be arranged. Accordingly, depending on the given spatial circumstances the heat recovery component is preferably arranged either in the engine compartment of the motor vehicle or at the beginning of the "tunnel" for accommodating the various components of the exhaust gas system (mufflers, pipes, etc.), this "tunnel" being provided in the chassis of the motor vehicle underneath the passenger compartment.

Due to the very limited space both in the engine compartment and in the tunnel provided in the chassis of the motor vehicle, there is extremely limited space available for accommodating the components of the exhaust gas system. Accordingly, the more voluminous a component is the more difficult it is to arrange the component in the engine compartment or in the "tunnel" provided in the chassis of the vehicle. As regards the "tunnel" provided in the chassis, the height of the component plays an even more important role as the height of the "tunnel" is limited.

Accordingly, in case of the heat recovery component shown in U.S. Pat. No. 6,141,961 the two branch conduits would have to be arranged horizontally and parallel to one another in order to keep the overall height of the component small, however, in this case the valve shaft protrudes upwardly or downwardly and the equipment required for driving the valve shaft must be arranged above or below the heat recovery component.

Alternatively (although not disclosed in U.S. Pat. No. 6,141,961), the actuator may be arranged laterally but in this case additional lever arm mechanisms would be required to drive the valve shaft, such lever arm constructions increasing complexity and reducing reliability and accuracy in controlling the valve flap positions. In any event, the result is a considerable increase in height of the heat recovery component, thus rendering the component less suitable for an arrangement in the "tunnel" provided in the chassis of the vehicle. Also, when the valve flap of the heat recovery component shown in the afore-mentioned U.S. Pat. No. 6,141,961 is in its first end position in which the exhaust gas stream is allowed to only flow through that branch conduit in which the heat exchanger is arranged (heating-up phase), there is only limited space available between the valve flap and the branch conduit wall through which the exhaust gas stream is intended to flow, resulting in substantial pressure drop to occur (due to backpressure generated). This leads to an increased fuel consumption of the engine to overcome this pressure drop (due to backpressure).

It is therefore an object of the invention to suggest a heat recovery component which has a small height and a very compact overall size, yet allowing for the flexibility to be adapted to different special spatial constraints given by the engine compartment or the "tunnel" so as to allow for an optimal fit in the space actually available. Also, the heat recovery component must be very efficient regarding fuel consumption. During the heating-up phase the heat recovery component should exhibit as high a heat recovery performance as possible, that is to say as much heat as possible should be transferred from the exhaust gas stream to the cooling fluid flowing through the heat exchanger (high heat exchanger efficiency). A pressure drop (due to backpressure generated by the heat recovery component) should be avoided or reduced to a minimum in all operating modes. Also, during bypass mode operation, for example when the engine has reached its desired operating temperature, as low an amount of parasitic heat as possible should be generated in order to prevent an undesired additional heating-up of the cooling fluid.

These and other objects are achieved by the heat recovery component according to the invention, as it is specified by the features of the independent claim. Further advantageous aspects of the heat recovery component according to the invention are the subject of the dependent claims.

In particular, the heat recovery component according to the invention comprises:
- an inlet for exhaust gas to enter the heat recovery component;
- an outlet for exhaust gas to exit the heat recovery component;
- a first branch conduit which is arranged between the inlet and the outlet of the heat recovery component, the first branch conduit comprising a first branch conduit inlet, a first branch conduit inlet longitudinal axis, a first branch conduit outlet, a first branch conduit outlet longitudinal axis, and a heat exchanger arranged in the first branch conduit;
- a second branch conduit which is arranged between the inlet and the outlet of the heat recovery component, the second branch conduit being separate from the first branch conduit and thermally separated from the first branch conduit, the second branch conduit comprising a second branch conduit inlet, a second branch conduit inlet longitudinal axis, a second branch conduit outlet and a second branch conduit outlet axis, to allow exhaust gas flowing through the second branch conduit to bypass the first branch conduit, the first branch conduit inlet longitudinal axis and the second branch conduit inlet longitudinal axis running parallel to each other and defining a first plane;
- a valve arranged at the first branch conduit inlet and the second branch conduit inlet, the valve being configured to be rotatable between a first end position, in which it allows exhaust gas to only flow through the first branch conduit, and a second end position, in which it allows exhaust gas to only flow through the second branch conduit.

The valve comprises separate first and second valve flaps, the first and second valve flaps being fixedly arranged on a rotatable common valve shaft which is arranged to extend in the first plane defined by the first and second branch inlet longitudinal axes of the first and second branch conduits on one hand and perpendicular to the first and second branch conduit inlet longitudinal axes on the other hand, with the first valve flap being arranged at an axial location on the common valve shaft corresponding to the location of the first branch conduit inlet, and with the second valve flap being arranged at an axial location on the common valve shaft corresponding to the location of the second branch conduit inlet, the first and second valve flaps being arranged angularly rotated relative to one another about the common valve shaft.

The terms "first branch conduit" and "second branch conduit" refer to conduits which extend longitudinally, however, neither the outer shape of the respective branch conduit nor the cross-section of the respective branch conduit necessarily has to be rotationally symmetrical. For example, the respective branch conduits may be embodied or comprise pipes, however, as mentioned, the pipes may have, but do not have to have, a rotationally symmetrical cross-section. By way of example, the cross-section and outer shape of the first branch conduit in which the heat exchanger is arranged either partly or entirely may have a non-rotationally symmetrical cross-section and shape. Also by way of example, the second branch conduit (or pipe) may have a circular cross-section and shape.

The first and second branch conduit inlet longitudinal axes of the first and second branch conduits together define a plane. When the heat recovery component is arranged in the "tunnel" of the chassis of the motor vehicle this plane extends preferably horizontal. As the valve shaft of the heat recovery component is arranged to extend in the plane defined by the first and second branch conduit inlet longitudinal axes and at the same time perpendicular to these first and second branch conduit inlet longitudinal axes, this means that the valve shaft protrudes laterally from the heat recovery component when the component is arranged in the "tunnel" of the chassis of the motor vehicle underneath the passenger compartment. Thus, the overall height of the heat recovery component according to the invention is kept at a minimum to allow for an easy arrangement of the component in the said "tunnel".

The first and second branch conduit outlet axes are preferably also running parallel to each other to define a second plane, although this is not mandatory. As will be explained in more detail below, in accordance with one aspect the first plane defined by the first and second branch conduit inlet axes and the second plane defined by the first and second branch conduit outlet axes coincide, however, this is again not mandatory. For example, it is possible that the first plane and the second plane are not coincident and may not even be parallel to each other. By way of example, the first and second planes may be normal to each other (meaning that the second branch conduit outlet axis is arranged above or below the first branch conduit outlet axis). Of course, in case one of the two conduits, preferably the second branch (bypass) conduit (e.g. pipe) is twisted from the second branch conduit inlet to the second branch conduit outlet which is easy to achieve from a constructional point of view. It is thus possible to have a more flexible geometry and shape of the overall component to optimally fit in the space available in the "tunnel" or in the engine compartment while at the same time the component still has a greatly reduced height (the drive shaft would still extend horizontally and the driving equipment can be arranged laterally so that the overall height is still kept small).

The first and second valve flaps arranged at different axial locations on the common valve shaft, thus enabling that the respective branch conduit can be optimally shut off with no or only extremely small leakage, as each of the individual flaps more or less constitutes a separate valve for the respective branch conduit. This means that during the heating-up phase the entire exhaust gas stream can flow through the first branch conduit and efficiently heat up the cooling fluid flowing through the heat exchanger.

The first and second valve flaps are arranged on the valve shaft angularly rotated relative to one another on the shaft, so that while one of the first and second valve flaps shuts off the first or second branch conduit (and is in the "closed" position), the other one of the first and second valve flaps allows the exhaust gas stream to flow through the respective second or first branch conduit (as it is in the "open" position).

Overall, the heat recovery component according to the invention is a fuel-saving, efficient, compact component having a small height to allow for arranging the component both in the engine compartment but in particular also in the "tunnel" of the chassis of a motor vehicle. Also, due to the first and second valve flaps being fixedly arranged on a common valve shaft, it is possible to determine by one single measurement of the position of that valve shaft whether the first valve flap or the second valve flap is in the "open" or "closed" position, respectively. This is advantageous as this information can be used in an OBD-system (On-Board-Diagnostics) of the motor vehicle.

In accordance with one aspect of the heat recovery component according to the invention, the first branch conduit outlet longitudinal axis and the second branch conduit outlet axis define a second plane, with the first plane, defined by the first branch conduit inlet longitudinal axis and the second branch conduit inlet longitudinal axis, and the second plane, defined by the first branch conduit outlet longitudinal axis and the second branch conduit outlet longitudinal axis, coinciding.

As has been mentioned already, this allows for a particularly flat construction of the heat recovery component, as the first and second branch conduits can then be embodied as straight parallel conduits. This is advantageous not only with respect to an extremely small height of the component but also with respect to a low pressure drop (due to low backpressure generated) of the heat recovery component.

The first and second branch conduit outlet axes of the first and second branch conduits are preferably also running parallel to each other to define a second plane, as will be discussed in more detail below, but they may alternatively include an angle of less than 45°, preferably less than 30°, and even more preferably less than 15° to prevent any backflow of exhaust gas from the second branch conduit (bypass branch conduit) back into the first branch conduit where the heat exchanger is arranged.

According to a further aspect of the heat recovery component according to the invention, the valve comprises a valve housing and separate first and second valve seats arranged in the valve housing, the first valve seat being arranged at the first branch conduit inlet to cooperate with the first valve flap and the second valve seat being arranged at the second branch conduit inlet to cooperate with the second valve flap. The first and second valve seats each comprise a flat circumferentially running abutment surface on an inner wall of the valve housing, the respective abutment surface having an inner boundary and an outer boundary. The first and second valve flaps are sized and shaped such that an outer boundary of the respective valve flap extends radially outwardly beyond the inner boundary of the flat circumferential abutment surface of the respective valve seat. The first and second valve flaps are further sized and shaped such that the outer boundary of the flat circumferential abutment surface of the respective valve seat is arranged radially outwardly of the outer boundary of the respective valve flap.

This aspect allows for a very rigid and durable construction of the valve, as a valve housing provides for high stiffness and thus renders the valve resistant to thermal deformation which may be caused either by welding (in the assembly/manufacturing process of the component) or during operation (temperature of the exhaust gases). An individual valve seat is provided in the valve housing for each of the individual first and second valve flaps, which allows for a very reliable shut-off of the individual branch conduit when the respective valve flap is in the "closed" position in which it abuts against the circumferentially running abutment surface of the respective valve seat. Due to the resistance of the valve housing to thermal deformation (see above), the respective valve flap provides for a reliable shut-off of the respective branch conduit when it is in the "closed" position so that leakage can be reduced to a minimum. Also, the valve housing may comprise a bearing for the valve shaft. As will be described in more detail below, the valve housing additionally allows for an efficient connection of an inlet connector piece to the valve housing (at the inlet side of the valve housing) in a manner such that the outlet of the inlet connector piece extends over both the first and second valve flaps. This allows for connecting the connector piece to the valve housing along one single welding seam only. At the outlet side of the valve housing, each of the first and second branch conduits is connected to the valve housing along an individual welding seam (rather than along a single welding seam).

The abutment surfaces of the valve seats each have an inner and an outer boundary. The first and second valve flaps are sized and shaped such that they extend radially outwardly over the inner boundary of the respective abutment surface of the respective valve seat, regardless of whether the valve flap is at high temperature or at low temperature (i.e. cold or hot). On the other hand, the first and second valve flaps are sized and shaped such that the outer boundary of the respective abutment surface is arranged radially outwardly of the outer boundary of the respective valve flap, so that there is some clearance between the outer boundary of the respective valve flap and the outer boundary of the respective abutment surface. This allows for a thermal expansion of the valve flap in the radial direction without such thermal expansion including the risk of blockage of the respective valve flap in the respective valve seat. It goes without saying that the valve flaps do not have to have a circular shape (for example, they may have oval, elliptical or even rectangular shapes), although a circular shape may be preferred.

In accordance with a further aspect of the heat recovery component according to the invention, the flat circumferentially running abutment surfaces of the first and second valve seats are arranged to each include an inclination angle in the range of 50° to 90° with the first and second branch conduit inlet longitudinal axes, with the direction of inclination of the abutment surface of the first valve seat being opposite to the direction of inclination of the abutment surface of the second valve seat. The angle included by the first and second valve flaps which are arranged angularly rotated on the valve shaft corresponds to the inclination angle of the abutment surfaces of the valve seats.

The term "opposite to the direction of inclination" in this regard means that in case the angle included between the abutment surface of the first valve seat and the first longitudinal axis of the first branch conduit is 60° (degrees), for example, the angle of inclination (if measured in the same direction) between the second abutment surface and the second longitudinal axis of the second branch conduit (counted in the same orientation) is −60°. However, if the angle included between the second abutment surface and the second longitudinal axis is counted in the opposite direction then this angle is also 60°.

This aspect is particularly advantageous in that the arrangement of the abutment surfaces at an inclination angle (of the same amount but at opposite directions) allows for a shorter switching time of the valve flap from the first end position ("closed" or "open" position) to the second end position ("open" or "closed" position) or vice versa, as the distance (angle) the respective valve flaps must be moved (rotated) is shorter. Although generally a range of 50° to 90° for the angle is envisaged, a more preferred range for the inclination angle is 60° to 80°. The valve flaps are arranged angularly rotated relative to each other on the valve shaft accordingly (smallest angle between the valve flaps is counted), as it is this angle that the valve shaft must be rotated to move the valve flaps from the "closed" position to the "open" position and vice versa. For example, if the inclination angle of the abutment surfaces is 60° and one valve flap is arranged in its "closed" position at 60°, then the other valve flap is arranged horizontally in its "open" position.

According to another aspect of the heat recovery component according to the invention, the valve comprises a valve housing and only one single valve seat arranged in the valve housing, with the single valve seat being arranged either at the first branch conduit inlet to cooperate with the first valve flap or at the second branch conduit inlet to cooperate with the second valve flap. The single valve seat comprises a flat circumferentially running abutment surface on an inner wall of the valve housing. The abutment surface has an inner boundary and an outer boundary. The first and second valve flaps are sized and shaped such that an outer boundary of the respective valve flap extends radially outwardly beyond the inner boundary of the flat circumferential abutment surface of the single valve seat. The first and second valve flaps are further sized and shaped such that the outer boundary of the flat circumferential abutment surface of the respective valve seat is arranged radially outwardly of the outer boundary of the respective valve flap.

This aspect is somehow related to the aspect discussed above where two such valve seats are provided, one for each of the first and second valve flaps. However, according to this aspect only one such valve seat is provided which allows for a complete shut-off of the respective conduit. Depending on whether the single valve seat is arranged at the first branch conduit inlet (where the heat exchanger is arranged) to cooperate with the first valve flap or is arranged at the second branch (bypass) conduit inlet cooperating with the second valve flap, the respective first or second branch conduit can be completely shut-off without leakage. Even though in this embodiment two valve flaps are provided, only that one of the branch conduits where the valve seat is arranged can be completely shut-off whereas the other branch conduit cannot be completely shut-off even when the respective valve flap is in the "closed" position. However, even at that branch conduit inlet where no valve seat is provided the valve flap in the "closed" position provides for a high exhaust gas flow resistance so that only very little exhaust gas flow through that branch conduit, since at the other branch conduit the respective valve flap is in the "open" position.

According to a further aspect of the heat recovery component according to the invention, the single valve seat is arranged at the first branch conduit inlet. That means that with the first valve flap being in the "open" position (e.g. during heating-up of the engine) the second (bypass) branch conduit is not completely shut-off but the second valve flap which is in the "closed" position provides for sufficient resistance to the exhaust gas flow through the second (bypass) branch conduit so that the vast majority of the exhaust gas flows through the first branch conduit and heat is recovered during such period. When the first valve flap is in the "closed" position the first branch conduit is completely shut-off as there is a valve seat for the valve flap. As a consequence, practically no flow will reach the heat exchanger and parasitic heat is minimal.

According to a further aspect of the heat recovery component according to the invention, the heat recovery component further comprises a thermal expansion compensator which is arranged in the first branch conduit or in the second branch conduit, for the compensation of different thermal expansion in length.

This aspect is advantageous since the two branch conduits are thermally separated from one another. This means, that during the heating-up phase in which the entire hot exhaust gas stream flows through the first branch conduit, the first branch conduit heats up and may expand in the longitudinal direction (i.e. it may increase in length). At the same time the second branch conduit does not expand in the longitudinal direction or expands only less (due to heating up much slower as no hot exhaust gas stream flows through the second branch conduit). The thermal expansion compensator, regardless of whether it is arranged in the first branch conduit or in the second branch conduit, compensates for such different thermal expansion in length. After the heating-up phase (i.e. during the bypass mode operation) when the engine has reached a desired temperature, the entire hot exhaust gas stream flows through the second branch conduit and bypasses the first branch conduit (and the heat exchanger arranged therein). Accordingly, the second branch conduit heats up and may increase in length while the first branch conduit may cool down and may decrease in length. Again, the thermal expansion compensator, regardless of whether it is arranged in the first branch conduit or in the second branch conduit, compensates for such different expansion in length. Accordingly, damages to the heat recovery component caused by different thermal expansion in length of the first and second branch conduits can be reliably avoided.

In accordance with yet another aspect of the invention, the heat recovery component further comprises a Y-shaped outlet connector piece having separate first and second inlet conduits smoothly merging into a single outlet conduit without any dead space being formed, the first inlet conduit, the second inlet conduit, and the outlet conduit together defining first and second main axes of flow through the respective inlet conduit of the outlet connector piece to the outlet conduit of the outlet connector piece, with the first inlet conduit of the Y-shaped outlet connector piece being connected to the first branch conduit outlet in a manner so as to be aligned with the first branch conduit outlet longitudinal axis, and the second inlet conduit of the Y-shaped outlet connector piece having a second cross-section being connected to the second branch conduit outlet in a manner so as to be aligned with the second branch conduit outlet longitudinal axis, and wherein at a location where the first and second main axes of flow meet, an angle of less than 45° (degrees) is included between the first and second main axes of flow.

The term "main axis of flow" denotes the central longitudinal axis of a virtual conduit including the respective inlet conduit and the outlet conduit of the outlet connector piece. Accordingly, the first main axis of flow denotes the central longitudinal axis of a virtual conduit that includes the first inlet conduit and the outlet conduit of the outlet connector piece, while the second main axis of flow denotes the central longitudinal axis of a virtual conduit that includes the second inlet conduit and the outlet conduit of the outlet connector piece. At a certain location in the outlet connector piece the first and second main axes of flow meet, and at that location they include an angle. Further downstream of the location where the first and second axes of flow meet they are continued as a common single main axis of flow towards the outlet of the outlet connector piece.

Preferably, the first and second branch conduit outlet longitudinal axes are parallel and define a plane (although generally they do not have to be mandatorily parallel and may include an angle of less than 45°, preferably less than 30°, even more preferably less than 15°), and the first and second inlet conduits of the Y-shaped outlet connector piece are connected to the first and second branch conduit outlets in a manner so as to be aligned with the first and second branch conduit longitudinal axes. However, even in the preferred case of parallel first and second branch conduit outlet longitudinal axes, at a location where the first and second inlet conduits of the Y-shaped outlet connector piece meet these first and second inlet conduits included an angle of less than 45°. This helps in avoiding a reverse flow of exhaust gases coming from the second branch conduit (bypass) back into the first branch conduit where the heat exchanger is arranged, as this would mean that the flow would have to be reversed by an angle of more than 135°. This measure is advantageous in that it helps in avoiding that the heat exchanger is exposed to an unwanted parasitic heat in the bypass mode of operation.

In accordance with yet a further aspect of the heat recovery component according to the invention, the first and second branch conduit outlets and the first and second inlet conduits as well as the outlet conduit of the outlet connector piece have a cross-section having a hydraulic diameter, and wherein the distance between a downstream end of the heat exchanger and the location where the first inlet conduit and the second inlet conduit meet is at least 0.7 times the hydraulic diameter of the cross-section of the first branch conduit outlet, more preferably at least 0.9 times the hydraulic diameter of the cross-section of the first branch conduit outlet, and even more preferably is equal to or greater than the hydraulic diameter of the cross-section of the first branch conduit outlet. The meaning of the term "hydraulic diameter" as used herein corresponds to the meaning well-known by those skilled in the art working in the field of flow through conduits, pipes or channels having a circular or non-circular cross-section. In particular, in case of a circular cross-section the "hydraulic diameter" is the diameter of that circular cross-section.

This aspect is advantageous as it additionally helps in avoiding a reverse flow of hot exhaust gas that has flown through the second branch conduit (bypass) into the first branch conduit due to there being a minimum distance between the downstream end of the heat exchanger and the location where the first and second inlet conduits of the Y-shaped outlet connector piece meet. Accordingly, this measure further assists in protecting the heat exchanger from being exposed to parasitic heat which would lead to an unwanted heating-up of the cooling fluid during bypass mode operation.

According to a further aspect of the invention, the heat recovery component further comprises an inlet connector piece having an inlet for connecting the heat recovery component to an upstream conduit or component of an exhaust gas system and having an outlet connected to the valve, wherein the inlet connector piece widens from its inlet towards its outlet, and wherein the outlet of the inlet connector piece is sized and shaped to extend over both the first valve flap and the second valve flap of the valve.

This aspect is advantageous as it allows on one hand to easily connect the heat recovery component to an upstream conduit or component of an exhaust gas system and on the other hand to connect the inlet connector piece to the valve. In particular, if the valve has a valve housing it is possible to connect the outlet of the inlet connector piece with a single welding seam to the valve housing. This is advantageous from a manufacturing point of view (only one welding seam). The outlet opening of the inlet connector piece extends over both the first valve flap and the second valve flap which are both exposed to the incoming exhaust gas stream at any time. The position of the respective valve flap, however, determines whether the exhaust gas stream flows through the first branch conduit or through the second branch conduit.

In accordance with still a further aspect of the heat recovery component according to the invention, the first and second branch conduits are thermally separated by an air gap arranged between the first and second branch conduits. This is advantageous from a manufacturing expense (no heat insulating material required).

In accordance with another aspect of the heat recovery component according to the invention, the first and second branch conduits are thermally separated by a heat insulating material arranged between the first and second branch conduits. This is advantageous as the heat insulating material may lead to an increased heat insulation when compared to air.

In accordance with yet another aspect of the heat recovery component according to the invention, the heat recovery component is configured to in operation during a heating-up phase of the internal combustion engine initially have the first valve flap and the second valve flap arranged in a first end position in which the exhaust gas coming from the internal combustion engine flows through the first branch conduit and through the heat exchanger, thereby heating up a cooling fluid of the internal combustion engine flowing through the heat exchanger which is then returned as a heated cooling fluid to the internal combustion engine such that the time needed to heat up the engine to a desired temperature is shortened. The heat recovery component is further configured to rotate the valve shaft until the first valve flap and the second valve flap are in the second end position as the internal combustion engine has reached the desired temperature, such that the exhaust gas coming from the combustion engine no longer flows through the first branch conduit but only flows through the second branch conduit.

This aspect is advantageous as it enables a shortened time period for heating-up of the engine to a desired temperature, and once the engine has reached the desired temperature, the heat exchanger is bypassed and parasitic heat is minimal.

Further advantageous aspects will become evident from the following detailed description of embodiments of the invention with the aid of the drawings in which:

FIG. 3 shows a perspective view of an embodiment of the valve of the heat recovery component of FIG. 1 including a valve housing, with the valve flaps arranged in a second end position in which they allow the exhaust gas stream to flow through the second branch conduit only (inlet side);

FIG. 4 shows a perspective view of the embodiment of the valve of FIG. 3 with the valve flaps arranged in the second end position (outlet side);

FIG. 5 shows a perspective view of the embodiment of the valve according to FIG. 3, with the valve flaps being arranged in the first end position in which they allow the exhaust gas stream to flow through the first branch conduit only (inlet side);

FIG. 6 shows a perspective view of the embodiment of the valve of FIG. 3 with the valve flaps being arranged in the first end position (outlet side);

Figure 1:
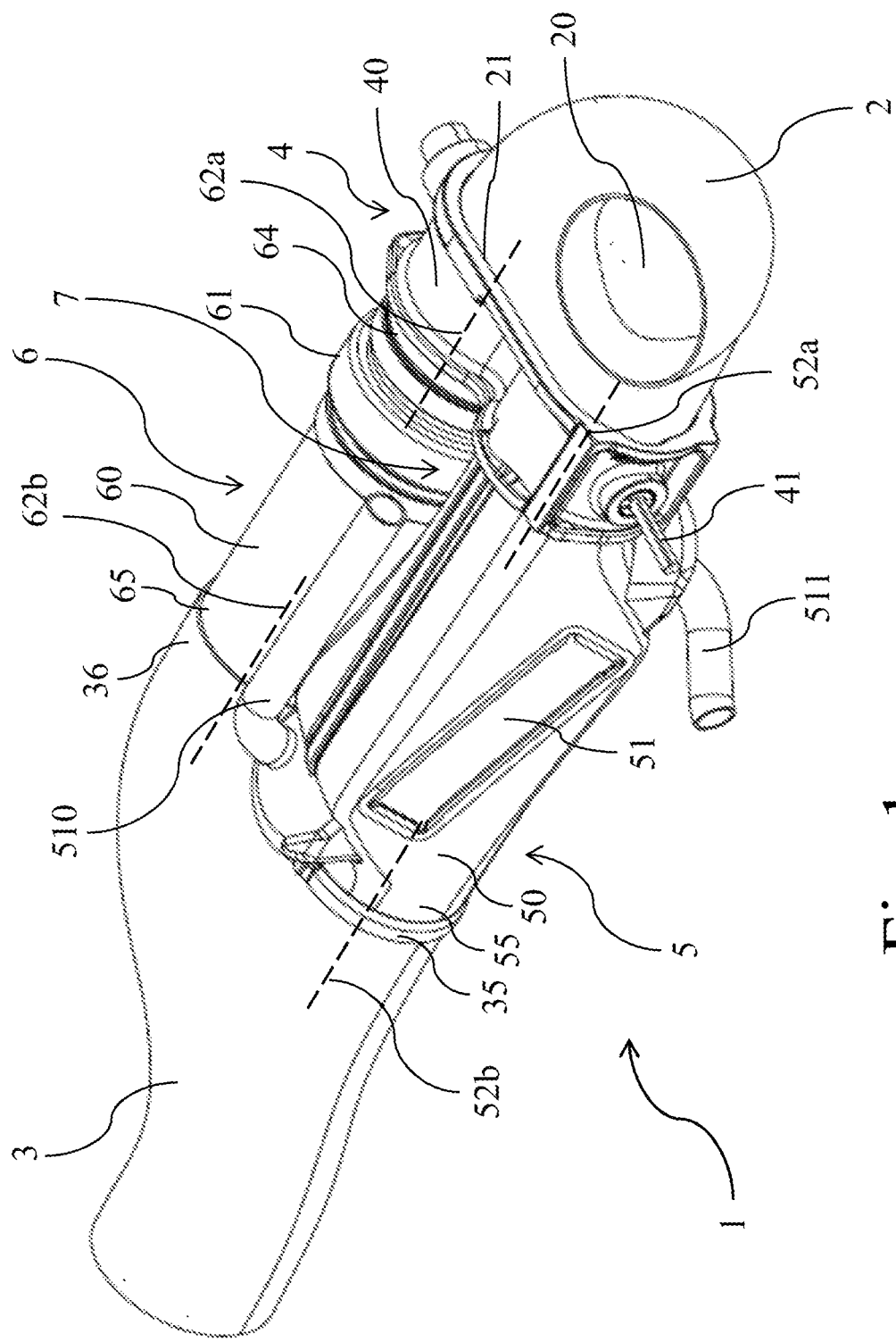
FIG. 1 shows a perspective view of an embodiment of the heat recovery component according to the invention.

In FIG. 1 an embodiment of a heat recovery component 1 according to the invention is shown. Heat recovery component 1 comprises an inlet connector piece 2, a Y-shaped outlet connector piece 3, a valve 4, a first branch conduit 5 and a second branch conduit 6. First branch conduit 5 comprises a pipe 50 or casing through which—depending on the mode of operation—an exhaust gas stream may flow, while second branch conduit 6 comprises a pipe 60 through which—depending on the mode of operation—the exhaust gas stream may flow, alternatively. However, the exhaust gas stream only flows through either the first branch conduit 5 or through the second branch conduit 6, although it is well within the scope of this invention to allow the flow of portions of the exhaust gas stream through both the first branch conduit 5 and the second branch conduit 6 in order to optimize heat recovery and pressure drop (due to back-pressure). With the aid of the valve it is determined whether the exhaust gas stream flows through the first branch conduit 5 or through the second branch conduit 6. An air gap 7 is arranged between the first branch conduit 5 and the second branch conduit 6 so that the first branch conduit 5 and the second branch conduit 6 are thermally separated (meaning that no heat is directly conducted from the wall of one branch conduit to the other). Alternatively, instead of the air gap 7 a heat insulating material can be arranged between the first and second branch conduits which may lead to improved thermal separation of the first branch conduit 5 and the second branch conduit 6 when compared to an air gap 7.

In the embodiment of the heat recovery component shown in FIG. 1, the inlet 20 of inlet connector piece 2 forms the inlet of the entire heat recovery component 1. From the inlet towards an outlet 21 inlet connector piece 2 widens, so that the outlet 21 of inlet connector piece 2 is connected to the valve 4 extending over both the first valve flap 45 and the second valve flap 46 (see FIG. 2).

A first inlet conduit 35 of outlet connector piece 3 is connected to a first branch conduit outlet 55 of the first branch conduit 5 while a second inlet conduit 36 of outlet connector piece 3 is connected to a second branch conduit outlet 65 of second branch conduit 6. At the outlet end, the outlet connector piece comprises an outlet 30 which in this embodiment of the heat recovery component forms the outlet of the entire heat recovery component.

Thus, the heat recovery component 1 shown in FIG. 1 can be easily connected to standard upstream or downstream pipes or components of an exhaust gas system of an internal combustion engine, for example of a motor vehicle.

The first branch conduit 5 comprises a first branch conduit inlet 53 (see again FIG. 2) through which an exhaust gas stream may enter the first branch conduit 5, and a heat exchanger 51 arranged in the first branch conduit 5. The second branch conduit 6 not only comprises the pipe 60 but also comprises another short pipe 64 as well which is connected to the valve 4. Between the short pipe 64 and the pipe 60 a thermal expansion compensator 61 is arranged in the second branch conduit which is connected to both the pipe 60 and the short pipe 64. The inlet of the short pipe 64 forms a second branch conduit inlet 63 (see FIG. 2).

As can be seen further from FIG. 1, a supply line 511 for supplying cooling fluid to the heat exchanger 51 as well as a drain line 510 for returning the heated cooling fluid to the engine are connected to the heat exchanger 51. While the drain line 510 is shown in FIG. 1 to be arranged on top of the heat recovery component for the sake of better visibility, it is well within the scope of the invention to arrange the drain line 510 laterally so that the overall height of the component (or its connections) is not affected by the arrangement of the drain line 510. A first branch conduit inlet longitudinal axis 52a of the first branch conduit 5 as well as a second branch conduit inlet longitudinal axis 62a of the second branch conduit 6 are also shown in FIG. 1, as well as a first branch conduit outlet longitudinal axis 52b and a second branch conduit outlet longitudinal axis 62b.

As can be seen from FIG. 1, valve 4 comprises a valve housing 40 and a valve shaft 41. Valve shaft 41 is arranged to extend in a first plane defined by first branch conduit inlet longitudinal axis 52a and second branch conduit inlet longitudinal axis 62a (running parallel to each other), and also valve shaft 41 is arranged perpendicular to the first branch conduit inlet longitudinal axis 52a and second branch conduit inlet longitudinal axis 62a. Also first branch conduit outlet longitudinal axis 52b and second branch conduit outlet longitudinal axis 62b (also running parallel to each other) define a second plane which, in the embodiment shown in FIG. 1, coincides with the first plane defined by first branch conduit inlet longitudinal axis 52a and second branch conduit inlet longitudinal axis 62a. Thus, the overall height of the heat recovery component 1 (which is measured perpendicular to the coinciding first and second planes) is not affected at all, as the valve shaft 41 protrudes laterally from the heat recovery component 1, or from the valve housing 40, respectively, so that this embodiment of the heat recovery component 1 according to the invention is extremely flat.

Figure 2:
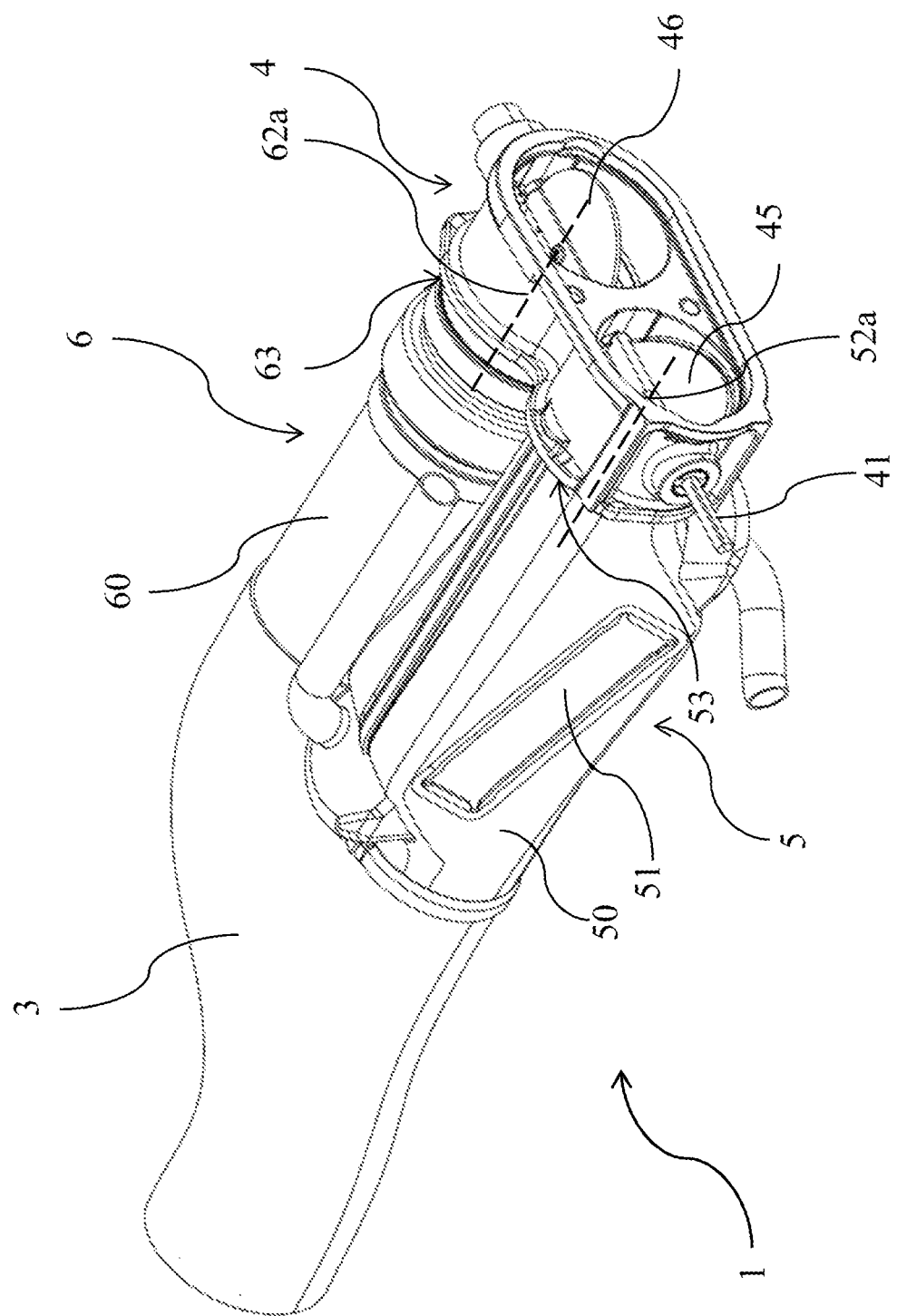
FIG. 2 shows a perspective view of the embodiment of the heat recovery component of FIG. 1 without the inlet connector piece.

In FIG. 2 the embodiment of the heat recovery component 1 of FIG. 1 is shown without the inlet connector piece 2. FIG. 2 contains a more detailed view of valve 4, as the first valve flap 45 and the second valve flap 46 for selectively allowing the exhaust gas stream to either flow through the first branch conduit 5 or the second branch conduit 6. As can be seen in FIG. 2, the second valve flap 46 is in a second end position in which it allows the exhaust gas stream to flow through the second branch conduit 6 while the first valve flap 45 in its second end position shuts off the first branch conduit 5 and prevents the exhaust gas stream from flowing through the heat exchanger 51. As has already been mentioned above, it is well within the scope of this invention to control the valve shaft 41 such that the first valve flap 45 and the second valve flap 46 are arranged at an intermediate position between the first and second end position to allow a portion of the exhaust gas stream to flow through the first branch conduit 5 while allowing another portion of the exhaust gas stream to flow through the second branch conduit 6 in order to optimize heat recovery and pressure drop (due to backpressure).

In FIG. 3 and FIG. 4 embodiments of the valve 4 of the heat recovery component 1 of FIG. 1 are shown. FIG. 3 shows a view of the inlet side of the valve 4, while in FIG. 4 a view of the outlet side of the valve 4 is shown. Valve 4 comprises a first valve seat 43 and a second valve seat 44 to cooperate with the first valve flap 45 and the second valve flap 46, respectively. The first valve seat 43 and the second valve seat 44 and their cooperation with the first valve flap 45 and the second valve flap 46 will be explained in more detail below. First valve flap 45 and second valve flap 46 are shown in FIG. 3 and FIG. 4 in the second end position already shown in FIG. 2 (bypass mode).

As can be seen from FIG. 3, on the inlet side of valve 4 the connector piece 2 (see FIG. 1) can be connected to the valve 4 via a flange 400 of valve housing 40 along a single welding seam, thus reducing the manufacturing expense. In contrast thereto, on the outlet side of valve 4 pipe 50 or casing of the first branch conduit 5 can be connected to the valve 4 along flange 401 of valve housing 40 through a separate welding seam, and the short pipe 64 can be connected to the valve 4 along flange 401 through a separate welding seam as well, so that on the outlet side of valve 4 two separate welding seams are formed along flange 401. As can be seen from FIG. 3 and FIG. 4, the first valve flap 45 and the second valve flap 46 are simultaneously rotated by the valve shaft 41 through rotation of the valve shaft 41, as both valve flaps are fixedly mounted to valve shaft 41.

FIG. 5 and FIG. 6 show the valve 4 with the first valve flap 45 and the second valve flap 46 being arranged in the first end position, in which the first valve flap 45 allows the exhaust gas stream to flow through the first branch conduit 5 in which the heat exchanger 51 is arranged, while the second valve flap 46 shuts off the second branch conduit 6 thereby preventing the exhaust gas stream from flowing through the second branch conduit 6 (heating-up mode). FIG. 5 shows again the inlet side of the valve 4 while FIG. 6 shows the outlet side of valve 4.

Figure 8:
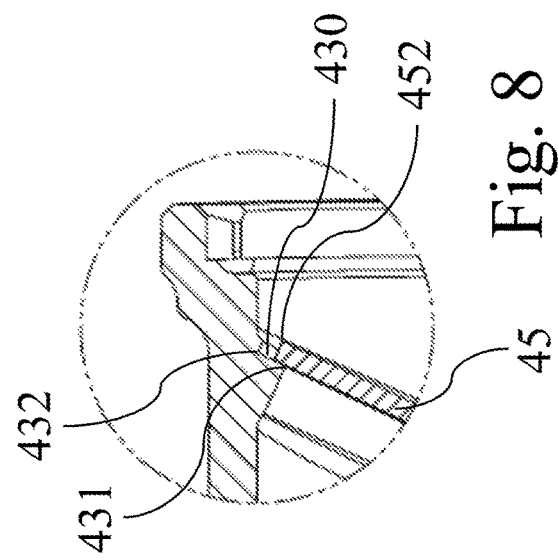
FIG. 8 shows the detail VIII of FIG. 7 in an enlarged view.
Figure 7:
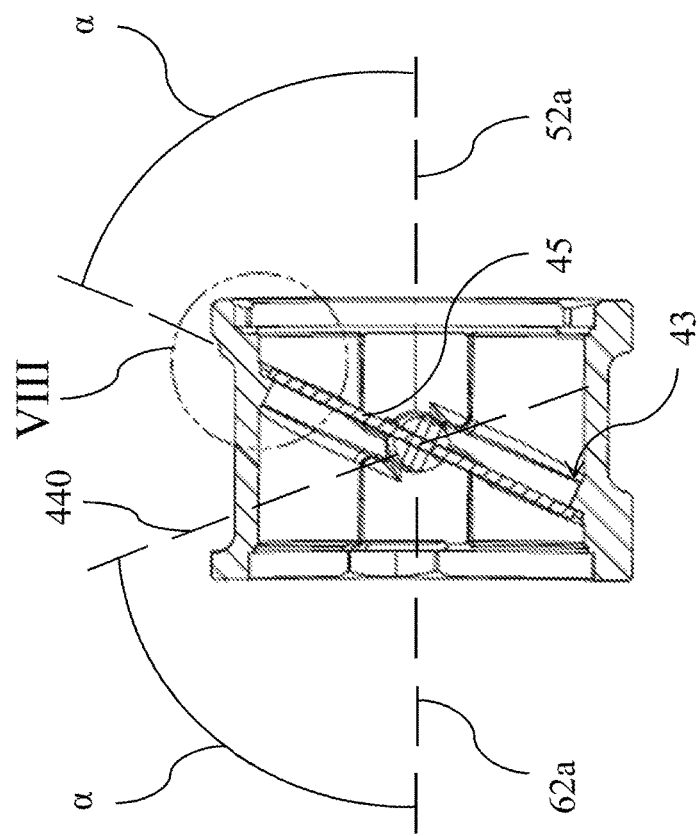
FIG. 7 shows a cross-sectional view of an embodiment of the valve seat of the valve according to FIG. 3.

FIG. 7 shows a cross-sectional view of an embodiment of the first valve seat 43 with the first valve flap 45 being in the second end position, and FIG. 8 shows the detail VIII of FIG. 7 in an enlarged view. As can be seen from FIG. 7 and FIG. 8, valve seat 43 comprises a flat (here: annular) circumferentially running abutment surface 430 having an inner boundary 431 and an outer boundary 432. First valve flap 45 has an outer boundary 452 having a diameter which is larger than the diameter of inner boundary 431 of abutment surface 430 but smaller than the diameter of outer boundary 432 of abutment surface 430, so that the outer boundary 452 of first valve flap 45 extends beyond the inner boundary 431 of abutment surface 430. This is independent of the temperature of first valve flap 45. Accordingly, first valve flap 45 in the second end position abuts against abutment surface 430 as shown in FIG. 7 and FIG. 8 to shut off the first branch conduit 5. Outer boundary 432 of abutment surface 430 of first valve seat 43, however, is arranged radially outwardly of the outer boundary 452 of first valve flap 45. This is again independent of the temperature of the first valve flap 45, so that in case the first valve flap thermally expands radially outwardly it does not get blocked.

As can also be seen in FIG. 7, the flat circumferentially running abutment surface 430 of first valve seat 43 includes an angle α with the first branch conduit inlet longitudinal axis 52a of first branch conduit 5. This angle α may generally be in the range of 50° to 90°, but more preferably is in the range of 60° to 80°. In the embodiment shown the angle α is about 65°. The second valve seat 44 (not shown in FIG. 7) includes a corresponding angle with the second branch conduit inlet longitudinal axis 62a of the second branch conduit 6 (inclination of abutment surface 440 indicated by dashed lines in FIG. 7 for illustration purposes only), however, the direction of inclination of the corresponding abutment surface 440 is opposite to the direction of inclination of the first abutment surface 430. This means, that in case the first valve flap 45 is in the second (inclined) end position shown in FIG. 7 shutting off the first branch conduit 5, the second valve flap 46 in this second end position is horizontally arranged allowing the exhaust gas stream to flow through the second branch conduit 6. Correspondingly, when the second valve flap 46 is in the first (inclined) end position shutting off the second branch conduit 6 (this position not being shown in detail in FIG. 7), the first valve flap 45 is horizontally arranged thereby allowing the exhaust gas stream to flow through the first branch conduit 5. Accordingly, the first valve flap 45 and the second valve flap 46 are not only arranged at different axial locations (corresponding to the axial distance between the centers of the first and second valve seats) on the valve shaft 41 but are also arranged angularly rotated about the valve shaft 41 relative to one another by the angle α. If the angle α is smaller than 90° (for example, 65° as shown in FIG. 7), the two valve flaps can be switched more quickly from the first end position to the second end position and vice versa, since the distance they have to be moved (rotated) in order to get switched from the first end position to the second end position or vice versa is shorter. Also, since the first and second valve flaps are fixedly arranged on the valve shaft 41, it is possible to measure the rotational position of the valve shaft 41 in order to determine whether the valve flaps are in the first end position or in the second end position (or in any other position). This is advantageous as this information can be used for an OBD-system (On-Board-Diagnostics system).

The above-described embodiment comprises two valve seats 43, 44, with the first valve seat 43 being arranged at the first branch conduit inlet 53 and the second valve seat 44 being arranged at the second branch conduit inlet 63. However, according to another aspect it is also possible to have only one single valve seat which is arranged either at the first branch conduit inlet 53 or at the second branch conduit inlet 63. Preferably, the one single valve seat 43 is arranged at the first branch conduit inlet 53 so that parasitic heat is minimal (see discussion further above).

Figure 9:
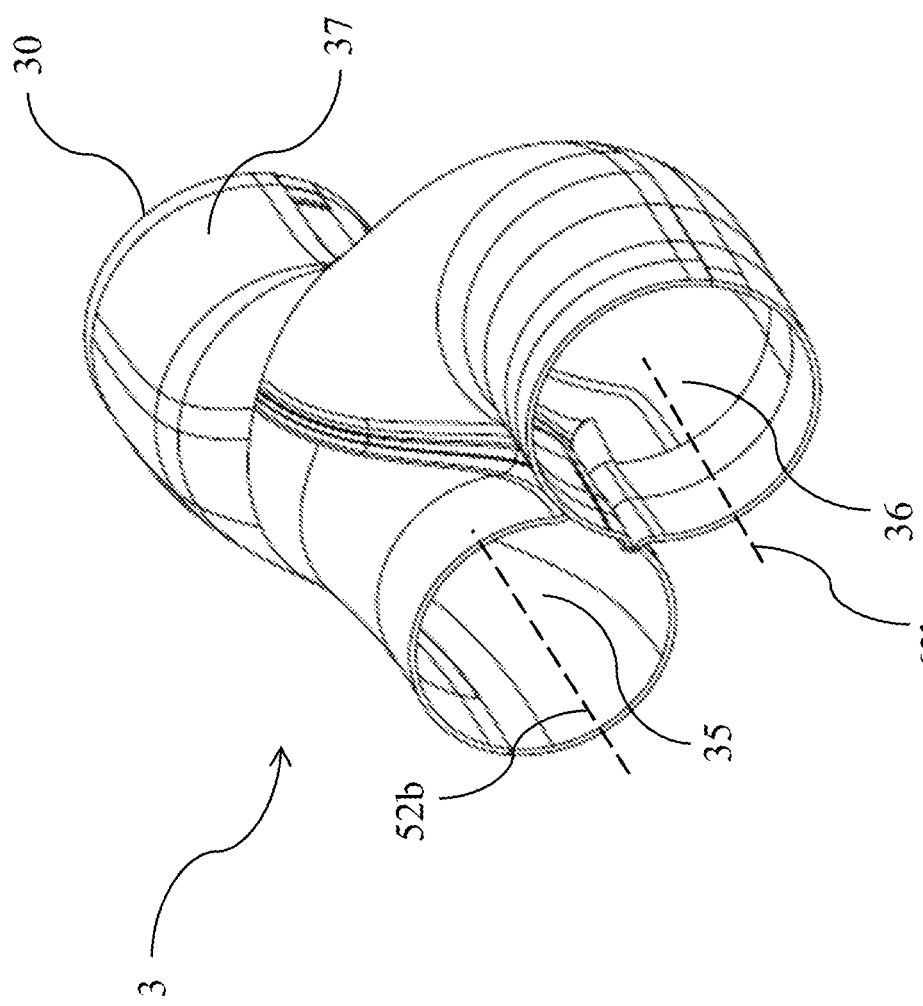
FIG. 9 shows a perspective view of the Y-shaped outlet connector piece of the heat recovery component shown in FIG. 1.

FIG. 9 shows a perspective view of the Y-shaped outlet connector piece 3 comprising first inlet conduit 35 and second inlet conduit 36 (see also FIG. 1) which are connected to the first branch conduit outlet 55 and to the second branch conduit outlet 65. Also, first branch outlet longitudinal axis 52*b* and second branch outlet longitudinal axis 62*b* are shown. The first inlet conduit 35 and the second inlet conduit 36 of outlet connector piece 3 smoothly merge into a single outlet conduit 37 leading to the outlet 30 of the heat recovery component. Thus, if the exhaust gas stream flows through the second branch conduit 6 (bypassing the heat exchanger arranged in the first branch conduit 5) and enters into the second inlet conduit 36 it flows from there directly to the outlet 30 of the outlet connector piece 3.

Figure 10:
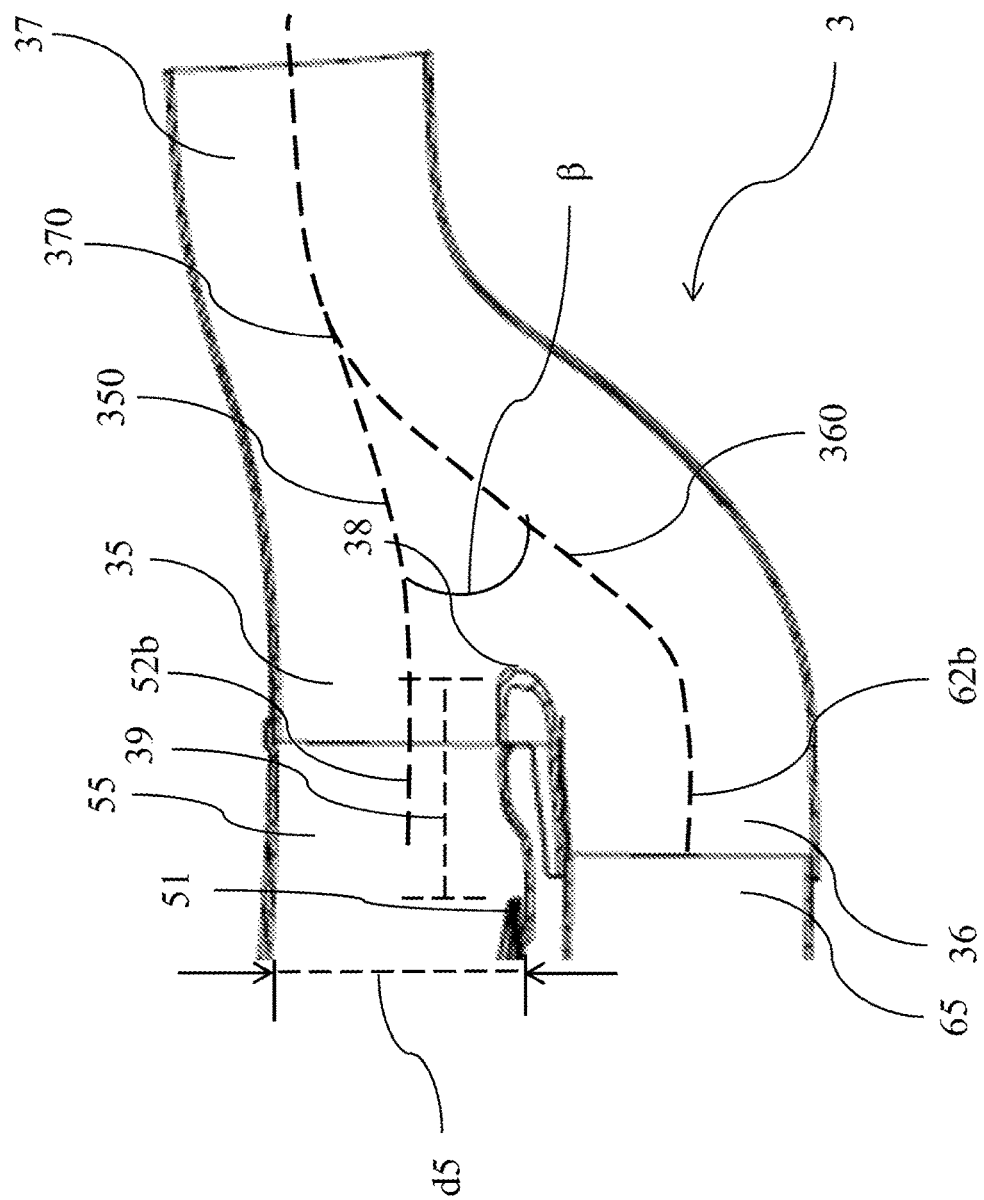
FIG. 10 shows a cross-sectional view of the outlet connector piece with the first inlet conduit of outlet connector piece being connected to the first branch conduit outlet.

FIG. 10 shows a cross-sectional view of the outlet connector piece 3 with the first inlet conduit 35 of outlet connector piece 3 being connected to the first branch conduit outlet 55 in a manner so as to be aligned with first branch conduit outlet longitudinal axis 52*b* and with the second inlet conduit 36 of outlet connector piece 3 being connected to the second branch conduit outlet 65 in a manner so as to be aligned with the second branch conduit outlet axis 62*b*. The first inlet conduit 35, the second inlet conduit 36 and the outlet conduit 37 together define a first main axis of flow 350 and a second main axis of flow 360. The first main axis of flow (of exhaust gas) and the second main axis of flow 360 meet a location 370 to include an angle β which is less than 45°. From the location 370 where the first main axis of flow 350 and the second main axis of flow 360 meet, they are continued as a common main axis of flow. One may imagine that there is a first virtual conduit (a virtual continuation of first inlet conduit 35 to the outlet conduit 37) and a second virtual conduit (a virtual continuation of second inlet conduit 36 to the outlet conduit 37), and the first main axis of flow 350 is the central longitudinal axis of the first virtual conduit while the second main axis of flow 360 is the central longitudinal axis of the second virtual conduit. Preferably, the angle β is smaller than 30°, and even more preferably the angle β is smaller than 15°. The smaller the angle β the better it is, as the flow of the hot exhaust gas stream through second inlet conduit 36 (coming from second branch conduit 6, the bypass) would have to revert by an angle of at least 135° (in case the angle β is 45°, and the smaller the angle β is the more the flow would have to revert) in order to be able to flow back towards the downstream end of heat exchanger 51 (arranged in first branch conduit 5) and to expose the heat exchanger to an unwanted parasitic heat. Also, the first inlet conduit 35 and the second inlet conduit 36 smoothly merge into the common outlet conduit 36 with no dead space (like pockets, abrupt changes in the diameter, or large expansions) being formed which may lead to an unwanted reverse flow of hot exhaust gas, which in turn may lead to exposure of the heat exchanger 51 to unwanted parasitic heat.

As shown in FIG. 10, the first branch conduit outlet 55, the second branch conduit outlet 65, as well as the first inlet conduit 35, the second inlet conduit 65 and the outlet conduit 37 of the outlet connector piece 3 all have a circular cross-section, however, as mentioned earlier this is not mandatory. In order to further protect the heat exchanger 51 from being exposed to parasitic heat from the hot exhaust gas stream flowing through the second branch conduit 6, a distance 39 between the downstream end of heat exchanger 51 and the location 38 where the first inlet conduit 35 and the second inlet conduit 36 meet, is at least 0.7 times the hydraulic diameter d5 of the cross-section of the first branch conduit outlet 55. More preferably, the distance 39 is at least 0.9 times of the hydraulic diameter d5, and even more preferably the distance 39 is equal to or greater than the hydraulic diameter d5 of the circular cross-section of the first branch conduit outlet 55. In this regard, it is to be noted that the hydraulic diameter for a circular cross-section is the diameter of the circular cross-section, but for other geometries of the cross-section (e.g. elliptical, square, rectangular, etc.) the hydraulic diameter is different. The greater the distance is in relation to the diameter d5, the better is the protection of the heat exchanger 51 to parasitic heat. Accordingly, there is either no or only an extremely small amount of parasitic heat to which the heat exchanger 51 may be exposed when the exhaust gas flows through the second branch conduit 6.

In operation, during the heating-up phase the first valve flap 45 and the second valve flap 46 initially are in the first end position in which the exhaust gas stream coming from the engine flows through the first branch conduit 5 and through the heat exchanger 51, thereby heating up the cooling fluid flowing through the heat exchanger 51 (this cooling fluid being the cooling fluid of the engine). The heated cooling fluid is returned to the engine thus leading to a quicker heating-up of the engine, so that the time needed to heat up the engine to the desired temperature is shortened resulting in a reduction of emissions or to reduced fuel consumption.

As the engine has reached the desired temperature, the valve shaft 41 is quickly rotated (by means of a suitable drive, not shown) until the first valve flap 45 and the second valve flap 46 are in the second end position. In this second end position, the exhaust gas stream coming from the engine no longer flows through the first branch conduit 5 but only flows through the second branch conduit 6 thus bypassing the heat exchanger 51. During this phase, the cooling fluid flowing through the engine is no longer heated up but can perform its normal function to cool the engine and contribute to keeping the engine at the desired temperature. In both end positions of the valve, due to the first and second branch conduits being straight there is no or only little back pressure which is advantageous with respect to fuel consumption. The thermal expansion compensator 61 compensates for differences in thermal expansions in length during the different phases. Due to the particular arrangement of the valve shaft 41 and the valve flaps, the height of the heat recovery component is kept at a minimum (not or only little higher than the typical pipe diameter or the diameter of the outlet of the Y-shaped connector piece) which allows for an arrangement of the heat recovery component in the "tunnel" of the chassis of a motor vehicle. At the same time, the overall size of the heat recovery component is small.

Figure 11:
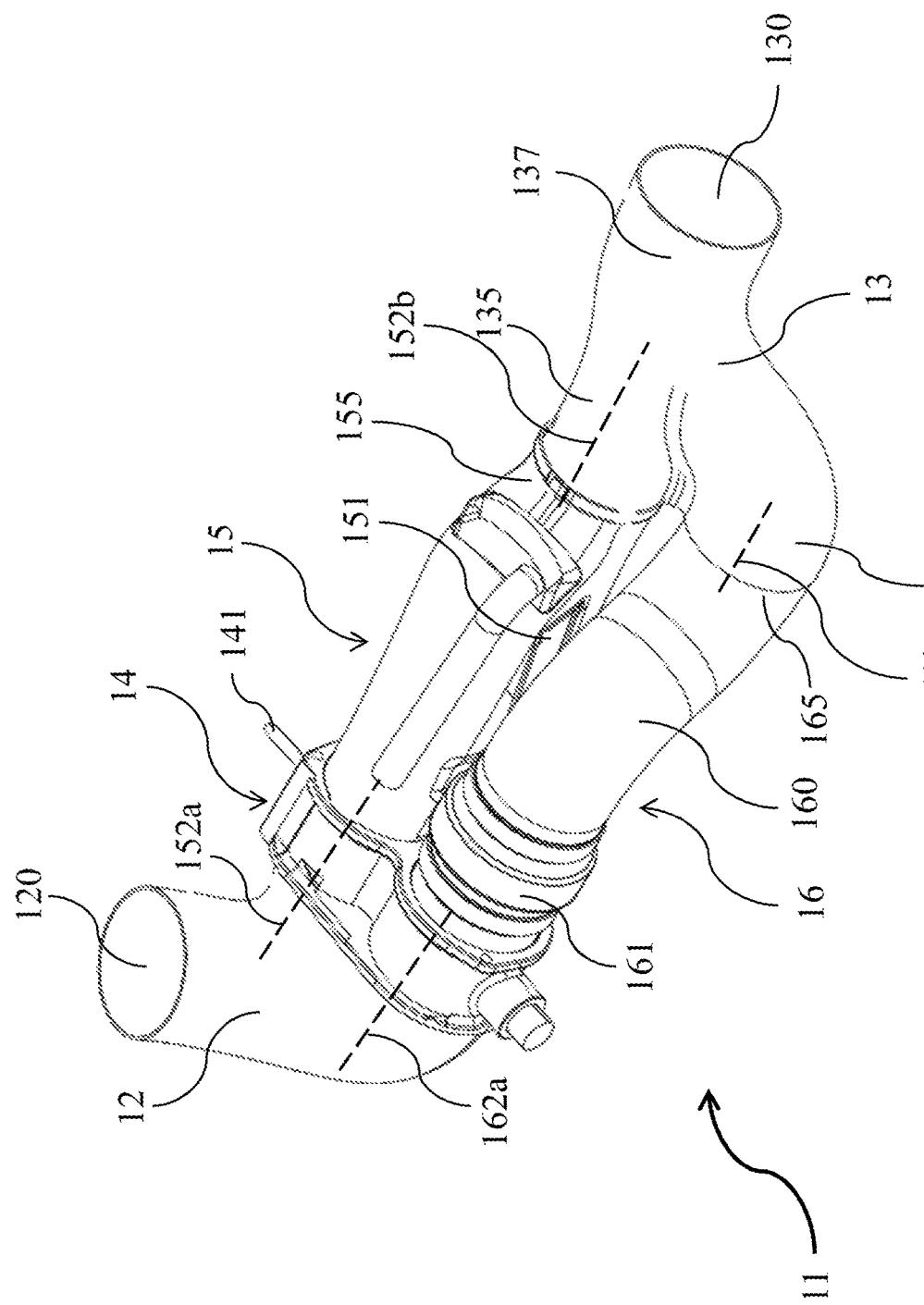
FIG. 11 shows a further embodiment of the heat recovery component according to the invention.

FIG. 11 shows a further embodiment of the heat recovery component according to the invention. Like parts of this further embodiment have been assigned like reference signs, however, a leading number "1" has been added to each part. For example inlet connector piece 12 (comprising inlet opening 120) of the embodiment of FIG. 11 corresponds to inlet connector piece 2 (comprising inlet opening 20) of the embodiment of FIG. 1.

Only some parts of the further embodiment shown in FIG. 11 will be described in the following, since in general this further embodiment of the heat recovery component 11 differs from the heat recovery component 1 mainly in that the second plane, defined by first branch conduit outlet longitudinal axis 152b and second branch conduit outlet longitudinal axis 162b, is neither coincident with the first plane, defined by the parallel running first branch conduit inlet longitudinal axis 152a (of the first branch conduit 15 in which the heat exchanger 151 is arranged) and second branch conduit inlet longitudinal axis 162a (of the second branch conduit 16 comprising the thermal expansion compensator 161), nor is this second plane parallel to the first plane anymore (although the second plane can be parallel to the first plane but at a different level). However, in the embodiment shown in FIG. 11, the pipe 160 of second branch conduit 16 is curved and twisted to some extent. Accordingly, the second plane includes an inclination angle with the first plane, and although not even shown this angle may amount even as much as ninety degrees (which would correspond to the second branch conduit outlet 165 being arranged above or beneath the first branch conduit outlet 155). Therefore, the spatial orientation of the Y-shaped outlet connector piece 13 (comprising again the first inlet conduit 135 and the second inlet conduit 136 as well as the common outlet conduit 137 leading to the outlet 130 of the heat recovery component) is different from the spatial orientation of the outlet connector piece 3 of the first embodiment of the heat recovery component 1 of FIG. 1.

This further embodiment of FIG. 11 is shown in particular for the sake of understanding that the heat recovery component is not limited to the somehow "straight" and flat design of the embodiment of the heat recovery component shown in FIG. 1, although this design is of particular advantage as regards the extremely small overall height of the component. However, the heat recovery component according to the invention allows for a flexible design of the outer shape of the component which can be adapted in a manner such that the component optimally fits in the space available either in the "tunnel" of the chassis underneath the passenger compartment or in the engine compartment of a motor vehicle. At the same time the overall height of the heat recovery component is still small, as the valve shaft 141 of valve 14 is still arranged in the first plane defined by the parallel running first branch conduit inlet longitudinal axis 152a and the second branch conduit inlet longitudinal axis 162a and also perpendicular to these axes, so that the driving equipment for driving valve shaft 141 can be arranged laterally to the heat recovery component 11. Accordingly, other shapes of the heat recovery component are therefore well within the scope of the instant invention.

Various aspects of the heat recovery component according to the invention have been described with the aid of the embodiment. However, the invention is not limited to the embodiment or the particular combination of aspects shown in the embodiment, as various changes and modifications to the shown embodiment are conceivable without departing from the technical teaching underlying the invention. Therefore, the scope of protection is defined only by the appended claims.

The invention claimed is:

1. Heat recovery component for an exhaust gas system of an internal combustion engine, the heat recovery component comprising:
   an inlet for exhaust gas to enter the heat recovery component;
   an outlet for exhaust gas to exit the heat recovery component;
   a first branch conduit which is arranged between the inlet and the outlet of the heat recovery component, the first branch conduit comprising a first branch conduit inlet, a first branch conduit inlet longitudinal axis, a first branch conduit outlet, a first branch conduit outlet longitudinal axis and a heat exchanger arranged in the first branch conduit;
   a second branch conduit which is arranged between the inlet and the outlet of the heat recovery component, the second branch conduit being separate from the first branch conduit and thermally separated from the first branch conduit, the second branch conduit comprising a second branch conduit inlet, a second branch conduit inlet longitudinal axis, a second branch conduit outlet and a second branch conduit outlet longitudinal axis, to allow exhaust gas flowing through the second branch conduit to bypass the first branch conduit, the first branch conduit inlet longitudinal axis and the second branch conduit inlet longitudinal axis running parallel to each other and defining a first plane;
   a valve arranged at the first branch conduit inlet and the second branch conduit inlet, the valve being configured to be rotatable between a first end position, in which it allows exhaust gas to only flow through the first branch conduit, and a second end position, in which it allows exhaust gas to only flow through the second branch conduit,
   wherein the valve comprises separate first and second valve flaps, the first and second valve flaps being fixedly arranged on a rotatable common valve shaft which is arranged to extend in the first plane defined by the first and second branch conduit inlet longitudinal axes of the first and second branch conduits on one hand and perpendicular to the first and second branch conduit inlet longitudinal axes on the other hand with the first valve flap being arranged at an axial location on the common valve shaft corresponding to the location of the first branch conduit inlet, and with the second valve flap being arranged at an axial location on the common valve shaft corresponding to the location of the second branch conduit inlet, the first and second valve flaps being arranged angularly rotated relative to one another about the common valve shaft; and a Y-shaped outlet connector piece having separate first and second inlet conduits smoothly merging into a single outlet conduit without any dead space being formed, the first inlet conduit, the second inlet conduit and the outlet conduit together defining first and second main axes of flow through the respective inlet conduit of the outlet connector piece to the outlet conduit of the outlet connector piece, with the first inlet conduit of the Y-shaped outlet connector piece being connected to the first branch conduit outlet in a manner so as to be aligned with the first branch conduit outlet longitudinal axis and the second inlet conduit of the Y-shaped outlet connector piece being connected to the second branch conduit outlet in a manner so as to be aligned with the second branch conduit outlet longitudinal axis, and wherein at a location where the first and second main axes of flow meet, an angle ($\beta$) of less than 45° is included between the first and second main axes of flow;

wherein the first and second branch conduit outlets and the first and second inlet conduits as well as the outlet conduit of the outlet connector piece have a cross-section having a hydraulic diameter, and wherein the distance between a downstream end of the heat exchanger and the location where the first inlet conduit and the second inlet conduit meet is at least 0.7 times the hydraulic diameter of the cross-section of the first branch conduit outlet.

2. Heat recovery component according to claim 1, wherein the first branch conduit outlet longitudinal axis and the second branch conduit outlet axis define a second plane, with the first plane, defined by the first branch conduit inlet longitudinal axis and the second branch conduit inlet longitudinal axis, and the second plane, defined by the first branch conduit outlet longitudinal axis and the second branch conduit outlet longitudinal axis, coinciding.

3. Heat recovery component according to claim 1, wherein the valve comprises a valve housing and separate first and second valve seats arranged in the valve housing, the first valve seat being arranged at the first branch conduit inlet to cooperate with the first valve flap and the second valve seat being arranged at the second branch conduit inlet to cooperate with the second valve flap, wherein the first and second valve seats each comprise a flat circumferentially running abutment surface on an inner wall of the valve housing, the respective abutment surface having an inner boundary and an outer boundary, wherein the first and second valve flaps are sized and shaped such that an outer boundary of the respective valve flap extends radially outwardly beyond the inner boundary of the flat circumferential abutment surface of the respective valve seat, and wherein the first and second valve flaps are further sized and shaped such that the outer boundary of the flat circumferential abutment surface of the respective valve seat is arranged radially outwardly of the outer boundary of the respective valve flap.

4. Heat recovery component according to claim 3, wherein the flat circumferentially running abutment surfaces of the first and second valve seats are arranged to each include an inclination angle (a) in the range of 50° to 90° with the first and second branch conduit inlet longitudinal axes of the first and second branch conduits, with the direction of inclination of the abutment surface of the first valve seat being opposite to the direction of inclination of the abutment surface of the second valve seat, and wherein the angle included by the first and second valve flaps which are arranged angularly rotated on the valve shaft corresponds to the inclination angle (a) of the abutment surfaces of the valve seats.

5. Heat recovery component according to claim 4, wherein the inclination angle (a) is in the range of 60° to 80°.

6. Heat recovery component according to claim 1, wherein the valve comprises a valve housing and only one single valve seat arranged in the valve housing, with the single valve seat being arranged either at the first branch conduit inlet to cooperate with the first valve flap or at the second branch conduit inlet to cooperate with the second valve flap, wherein the single valve seat comprises a flat circumferentially running abutment surface on an inner wall of the valve housing, the abutment surface having an inner boundary and an outer boundary, wherein the first and second valve flaps are sized and shaped such that an outer boundary of the respective valve flap extends radially outwardly beyond the inner boundary of the flat circumferential abutment surface of the single valve seat, and wherein the first and second valve flaps are further sized and shaped such that the outer boundary of the flat circumferential abutment surface of the respective valve seat is arranged radially outwardly of the outer boundary of the respective valve flap.

7. Heat recovery component according to claim 6, wherein the single valve seat is arranged at the first branch conduit inlet.

8. Heat recovery component according to claim 1, further comprising a thermal expansion compensator which is arranged in the first branch conduit or in the second branch conduit, for the compensation of different thermal expansion in length.

9. Heat recovery component according to claim 1, further comprising an inlet connector piece having an inlet for connecting the heat recovery component to an upstream conduit or component of an exhaust gas system and having an outlet connected to the valve, wherein the inlet connector piece widens from its inlet towards its outlet, and wherein the outlet of the inlet connector piece is sized and shaped to extend over both the first valve flap and the second valve flap of the valve.

10. Heat recovery component according to claim 1, wherein the first and second branch conduits are thermally separated by an air gap arranged between the first and second branch conduits.

11. Heat recovery component according to claim 1, wherein the first and second branch conduits are thermally separated by a thermal insulating material arranged between the first and second branch conduits.

12. Heat recovery component according to claim 1, wherein the heat recovery component is configured to in operation during a heating-up phase of the internal combustion engine initially have the first valve flap and the second valve flap arranged in a first end position in which the exhaust gas coming from the internal combustion engine flows through the first branch conduit and through the heat exchanger, thereby heating up a cooling fluid of the internal combustion engine flowing through the heat exchanger which is then returned as a heated cooling fluid to the internal combustion engine such that the time needed to heat up the engine to a desired temperature is shortened, and wherein the heat recovery component is further configured to rotate the valve shaft until the first valve flap and the second valve flap are in the second end position as the internal combustion engine has reached the desired temperature, such that the exhaust gas coming from the combustion engine no longer flows through the first branch conduit but only flows through the second branch conduit.

13. Heat recovery component according to claim 1, wherein the distance between the downstream end of the heat exchanger and the location where the first inlet conduit and the second inlet conduit meet is at least 0.9 times the hydraulic diameter of the cross-section of the first branch conduit outlet.

14. Heat recovery component according to claim 1, wherein the distance between the downstream end of the heat exchanger and the location where the first inlet conduit and the second inlet conduit meet is equal to or greater than the hydraulic diameter of the cross-section of the first branch conduit outlet.

* * * * *